United States Patent
Nagle et al.

(10) Patent No.: US 8,600,530 B2
(45) Date of Patent: Dec. 3, 2013

(54) METHOD FOR DETERMINING AN AUDIO DATA SPATIAL ENCODING MODE

(75) Inventors: Arnault Nagle, Lannion (FR); Auréllen Sollaud, Trebeurden (FR); Manuel Briand, Suede (FR)

(73) Assignee: France Telecom, Paris (FR)

( * ) Notice: Subject to any disclaimer, the term of this patent is extended or adjusted under 35 U.S.C. 154(b) by 1142 days.

(21) Appl. No.: 12/087,321

(22) PCT Filed: Dec. 13, 2006

(86) PCT No.: PCT/FR2006/051348
§ 371 (c)(1),
(2), (4) Date: Jun. 27, 2008

(87) PCT Pub. No.: WO2007/074269
PCT Pub. Date: Jul. 5, 2007

(65) Prior Publication Data
US 2008/0319764 A1  Dec. 25, 2008

(30) Foreign Application Priority Data
Dec. 27, 2005 (FR) .................................. 05 54106

(51) Int. Cl.
*G06F 17/00* (2006.01)
(52) U.S. Cl.
USPC .................. 700/94; 381/22; 381/23; 381/77
(58) Field of Classification Search
USPC ............ 381/22–23, 74, 77–78, 1, 17; 700/94; 704/500–501, 223
See application file for complete search history.

(56) References Cited

U.S. PATENT DOCUMENTS

| | | | | |
|---|---|---|---|---|
| 7,440,810 B2 * | 10/2008 | Konetski | .......................... | 700/94 |
| 7,792,311 B1 * | 9/2010 | Holmgren et al. | .............. | 381/61 |
| 2002/0138108 A1 | 9/2002 | Weiner et al. | | |
| 2003/0063574 A1 | 4/2003 | Virolainen | | |
| 2004/0024478 A1 * | 2/2004 | Hans et al. | ....................... | 700/94 |
| 2005/0157660 A1 | 7/2005 | Mandato et al. | | |
| 2009/0005892 A1 * | 1/2009 | Guetta et al. | .................... | 700/94 |

OTHER PUBLICATIONS

H. Schulzrinne et al., "RTP Profile for Audio and Video Conferences with Minimal Control; rfc3551.txt", IETF Standard, Internet Engineering Task Force, IETF, Switzerland, Jul. 2003, pp. 1-44.
Kim Chun-Geun, et al., "3-Dimensional Voice Communication System for Two User Groups", Advanced Communication Technology, 2005, ICACT 2005. The 7th Int'l. Conference on Phoenix Park, Korea, Feb. 21-23, 2005, Piscataway, N.J. USA, IEEE Feb. 21, 2005, pp. 1-6.
Peter Noll, "MPEG Digital Audio Coding—Setting the Standard for High-Quality Audio Compression", IEEE Signal Processing Magazine, Sep. 1997, pp. 59-81.

* cited by examiner

*Primary Examiner* — Disler Paul
(74) *Attorney, Agent, or Firm* — Cozen O'Connor

(57) ABSTRACT

A method of determining a spatial coding mode for audio data sent by a sender entity (20) to a receiver terminal (10) adapted to receive said audio data in one or more sound reproduction formats. The method comprises the steps of the receiver terminal (10) indicating (1) to the sender entity (20) said reproduction format(s) in a given order of preference and the sender entity (20) determining a mode of spatial coding of the audio data compatible with a reproduction format taken in the order of preference and indicating (2) said reproduction format to the receiver terminal (10). Application to Voice over IP services.

9 Claims, 4 Drawing Sheets

```
INVITE sip:bob@biloxi.example.com SIP/2.0
Via: SIP/2.0/UDP client.atlanta.example.com:5060;branch=z9hG4bK74bf9
Max-Forwards: 70
From: Alice <sip:alice@biloxi.example.com>;tag=9fxced76sl
To: Bob <sip:bob@biloxi.example.com>
Call-ID: 3848276298220188511@atlanta.example.com
CSeq: 1 INVITE
Contact: <sip:alice@biloxi.example.com>
Content-Type: application/sdp
Content-Length: 151 v=0
o=alice 2890844526 2890844526 IN IP4 client.atlanta.example.com
s=-
c=IN IP4 192.0.2.101
t=0 0
m=audio 49172 RTP/AVP 96
a=rtpmap:96 L16/16000/2
a=spat:2,3,0
```

Fig. 5

```
SIP/2.0 200 OK
Via: SIP/2.0/UDP client.atlanta.example.com:5060;branch=z9hG4bK74bf9
;received=192.0.2.101
From: Alice <sip:alice@atlanta.example.com>;tag=9fxced76sl
To: Bob <sip: bob@biloxi.example.com>;tag=8321234356
Call-ID: 3848276298220188511@atlanta.example.com
CSeq: 1 INVITE
Contact: <sip:bob@biloxi.example.com>
Content-Type: application/sdp
Content-Length: 147 v=0
o=bob 2890844527 2890844527 IN IP4 client.biloxi.example.com
s=-
c=IN IP4 192.0.2.201
t=0 0
m=audio 34568 RTP/AVP 96
a=rtpmap:96 L16/16000/2
a=spat:1,0
a=spat_rep: 3
```

Fig. 6

```
ACK sip:bob@client.biloxi.example.com SIP/2.0
Via: SIP/2.0/UDP client.atlanta.example.com:5060;branch=z9hG4bK74bd5
Max-Forwards: 70
From: Alice <sip:alice@biloxi.example.com>;tag=9fxced76sl
To: Bob <sip:bob@biloxi.example.com>;tag=8321234356
Call-ID: 3848276298220188511@atlanta.example.com
CSeq: 1 ACK
Content-Length: 0 v=0
o=alice 2890844526 2890844526 IN IP4 client.atlanta.example.com
s=-
c=IN IP4 192.0.2.101
t=0 0
m=audio 49172 RTP/AVP 96
a=rtpmap:96 L16/16000/2
a=spat_rep:1
```

Fig. 7

```
v=0
o=alice 2890844526 2890844526 IN IP4 client.atlanta.example.com
s=-
c=IN IP4 192.0.2.101
t=0 0
m=audio 0 RTP/AVP 96
a=rtpmap:96 L16/16000/2
a=spat:3,1,0
m=video 0 RTP/AVP 31 34
a=rtpmap: 31 H261/90000
a=rtpmap: 34 H263/90000
```

Fig. 8

METHOD FOR DETERMINING AN AUDIO DATA SPATIAL ENCODING MODE

RELATED APPLICATIONS

This is a U.S. national stage under 35 USC 371 of application No. PCT/FR2006/051348, filed on Dec. 13, 2006.

This application claims the priority of French patent application no. 05/54106 filed Dec. 27, 2005, the content of which is hereby incorporated by reference.

FIELD OF THE INVENTION

The present invention relates to a method of determining a spatial coding mode for audio data.

The invention finds an application in the general context of developing audio services using the Internet Protocol (IP) generically referred to as Voice over IP (VoIP) services.

The invention can be implemented in packet-switched data transport networks, such as the Internet, using specific VoIP signaling protocols, such as the Session Initiation Protocol (SIP), to control call management and real-time data transport protocols, such as the Real Time Transfer Protocol (RTP), to transport audio data.

One particularly advantageous application of the invention relates to VoIP audio conferences providing spatial sound reproduction for each participant.

BACKGROUND OF THE INVENTION

In the context of audio conferences, a number of audio stream exchange configurations can be envisaged:
  centralized multipoint connections where a sending entity in the network, generally called the "bridge", manages audio streams sent to the receiver terminals of the participants;
  distributed multipoint connections where each terminal receives and processes audio streams from the terminals of other participants and sends its own audio stream to them;
  point-to-point connections where only two terminals are in communication, each playing the role of sender entity and receiver terminal.

At present, the terminals of audio conference participants can provide a number of spatial reproduction formats, for example:
  the binaural format for 3D spatial listening via headphones;
  the stereo dipole format for 3D spatial listening via two loudspeakers;
  the surround sound format for 2D or 3D spatial listening via several loudspeakers;
  multichannel (5.1, 7.1, etc.) audio formats for 2D spatial listening via several loudspeakers.

During an audio conference the sender entity, such as the bridge of a centralized multipoint connection, spatially encodes the received audio streams to generate a virtual audio sound scene in two dimensions, in the horizontal plane, or in three dimensions, in space. To this end, the sender entity uses a particular mode of spatial coding of the audio data, which can be the binaural, stereo dipole, etc. coding mode. The audio streams spatially coded in this way by the sender entity are then transmitted to the receiver terminals via audio coders-decoders (codecs) chosen as the result of a standard VoIP negotiation procedure. At present monophonic and stereophonic audio codecs are available.

It is therefore possible to transmit binaural or stereo dipole spatial coding using a stereophonic audio codec. However, the receiver terminal cannot identify the spatial, for example binaural or stereo dipole, content of the data. At present, audio data spatially coded by existing audio codecs is processed in the same way as an ordinary mono or stereo audio stream with no spatial information.

US patent application 2002/0138108 clearly illustrates this situation where a sender entity consisting of a bridge takes account only of how the participants in the audio conference are to be distributed in space, in audio images specific to each participant or common to them all, but without knowing which spatial coding format (binaural, stereo dipole, surround sound, etc.) to use.

The problems that then arise are shown in FIG. 1, which is a diagram of the streams exchanged over a prior art centralized multipoint connection.

FIG. 1 shows a bridge serving as the sender entity and three receiver terminals that transmit their own audio stream to the bridge using monophonic audio coding. The bridge decodes the received audio streams and then effects spatial coding, for example binaural spatial coding.

The terminals 1 and 2 are provided with respective headsets appropriate for listening to binaural signals and the terminal 3 is equipped with two loudspeakers for reproducing the stereo dipole format.

In this configuration, the binaural spatial coding mode arbitrarily selected by the bridge is not directly compatible with the stereo dipole reproduction format used by the terminal 3, which must then convert from the binaural coding to stereo dipole coding, which is reflected in a CPU load and delay overhead incurred by the central processor unit of the terminal.

Clearly, the problems described with reference to FIG. 1 are generally the result of the fact that a receiver terminal, such as a personal computer (PC), can have a number of peripherals, such as a headset, any number of loudspeakers, etc., associated with different reproduction formats, and that the remote applications installed on a sender entity connected to the terminal via the network are also obliged to make arbitrary choices for spatial coding, independent of the reproduction format configured by the user of the receiver terminal.

SUMMARY OF THE INVENTION

One object of the present invention is to provide a method of determining a mode for spatial coding of audio data sent by a sender entity to a receiver terminal adapted to receive said audio data in one or more reproduction formats. The spatial coding mode so determined, for example in a bridge, and the negotiation of the corresponding audio codec, can therefore take account of the required reproduction format, in order to optimize spatial reproduction, and above all to reduce the calculations that would result from the wrong choice of format. For example, as explained above, sending in the binaural format to a PC having no headset would require conversion to a format for spatial reproduction by two loudspeakers, for example the stereo dipole format.

One aspect of the present invention is directed to a method that comprises the steps of:
  the receiver terminal indicating said one or more reproduction formats to the sender entity in a given order of preference;
  the sender entity determining a mode for spatial coding of the audio data compatible with a reproduction format taken in the given order of preference and indicating said reproduction format to the receiver terminal.

Thus, a method in accordance with an embodiment of the invention informs the sender entity of the reproduction formats available at the receiver terminal and thus enables said sender entity to determine and use a spatial coding mode suitable for one of those formats. In return, the sender entity informs the receiver terminal of the reproduction format in which to receive the audio stream coded in the spatial coding mode determined in this way.

The advantages of such a method are as follows:
- the possibility of optimizing spatial audio reproduction as a function of the reproduction formats of the receiver terminals and the choice of the user or the terminal, i.e. consistent sound reproduction quality, all terminals using the correct spatial mode, and homogeneous, and therefore enhanced, spatial quality, since the terminal does not use a different spatial mode;
- the audio codec chosen is that best suited to the reproduction format chosen by the user or the terminal;
- because it is not necessary to change from one reproduction format to another, the computation load is reduced during spatial decoding in the receiver terminals.

In practical terms, the receiver terminal indicates said reproduction format(s) and said order of preference in a message sent to the sender entity and said sender entity indicates the reproduction format to be used in a response message sent to the receiver terminal.

As a sender entity can also play the role of receiver terminal, and vice-versa, for example on a point-to-point connection, the invention provides for the sender entity also to indicate reproduction formats in said response message in a given order of preference and for said receiver terminal to indicate the reproduction format to be used in a response message sent to the sender entity.

In one embodiment of the method of the invention, the sender entity and the receiver terminal exchange information concerning reproduction formats in signaling messages.

Said signaling messages are more particularly SIP signaling messages.

The invention also relates to a message from a receiver terminal adapted to receive in one or more reproduction formats audio data sent by a sender entity adapted to send spatial audio data, remarkable in that said message includes an indication of said reproduction format(s) in a given order of preference.

The invention likewise relates to a response message from the sender entity to the message from the receiver terminal, noteworthy in that said response message includes an indication of the reproduction format to be used by the receiver terminal.

According to an embodiment of the invention, said response message also includes an indication of the reproduction format(s) of the sender entity in a given order of preference.

Of course, the receiver terminal in turn responds to this response message by sending the sender entity an indication of the reproduction format to be used.

BRIEF DESCRIPTION OF THE DRAWINGS

FIG. 5 is an example of the content of the SIP INVITE message shown in FIG. 4.

FIG. 6 is an example of the content of the SIP 200 OK message shown in FIG. 4.

FIG. 7 is an example of the content of the SIP ACK message shown in FIG. 4.

FIG. 8 is an example of the SDP content of a SIP message for an SDP change of capacity between two terminals.

DETAILED DESCRIPTION OF THE DRAWINGS

Figure 2:
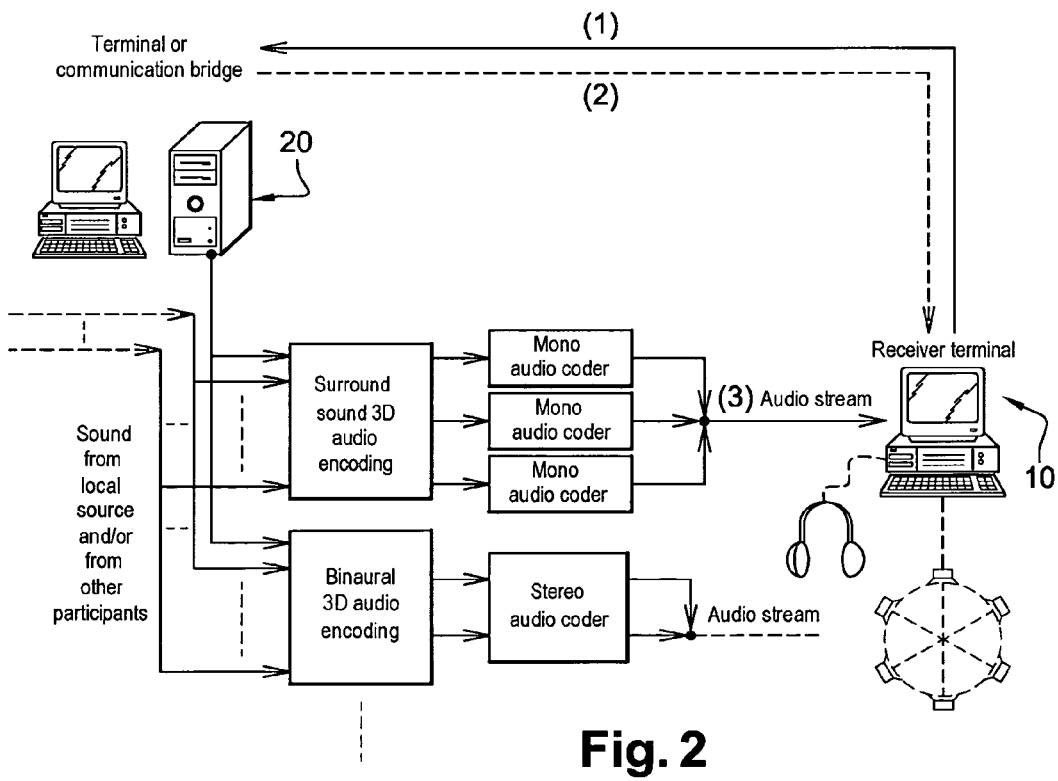
FIG. 2 is a diagram illustrating transmission by a method in accordance with an embodiment of the invention of a spatial audio scene between a sender entity and a receiver terminal.

FIG. 2 shows a receiver terminal 10 with two formats for spatial reproduction of audio data supplied by a sender entity 20, such as a bridge or another terminal. Those two formats are a surround sound format that involves listening via six loudspeakers and a binaural format that involves listening via headphones. The preference of the user is to receive audio streams in the surround sound format.

To this end, the user sends (1) the sender entity 20 a SIP signaling message, which is described in detail below, which indicates that the receiver terminal 10 can receive audio streams in the surround sound and binaural formats, with a preference for the surround sound format.

It is assumed that the remote sender entity 20 can spatially code in surround sound mode a sound scene made up of sound from local sources or from other participants in an audio conference, for example.

The sender entity 20 therefore sends (3) the receiver terminal 10 the various surround sound channels, each coded by a monophonic coder and then multiplexed in order to be sent via the network as a single stream. The remote entity 20 then indicates (2) to the receiver terminal 10 that the data contained in the monophonic channels is spatially encoded in the surround sound mode, so that the terminal knows to treat it as such and to use spatial decoding appropriate to reproducing the surround sound format via the six loudspeakers.

Figure 1:
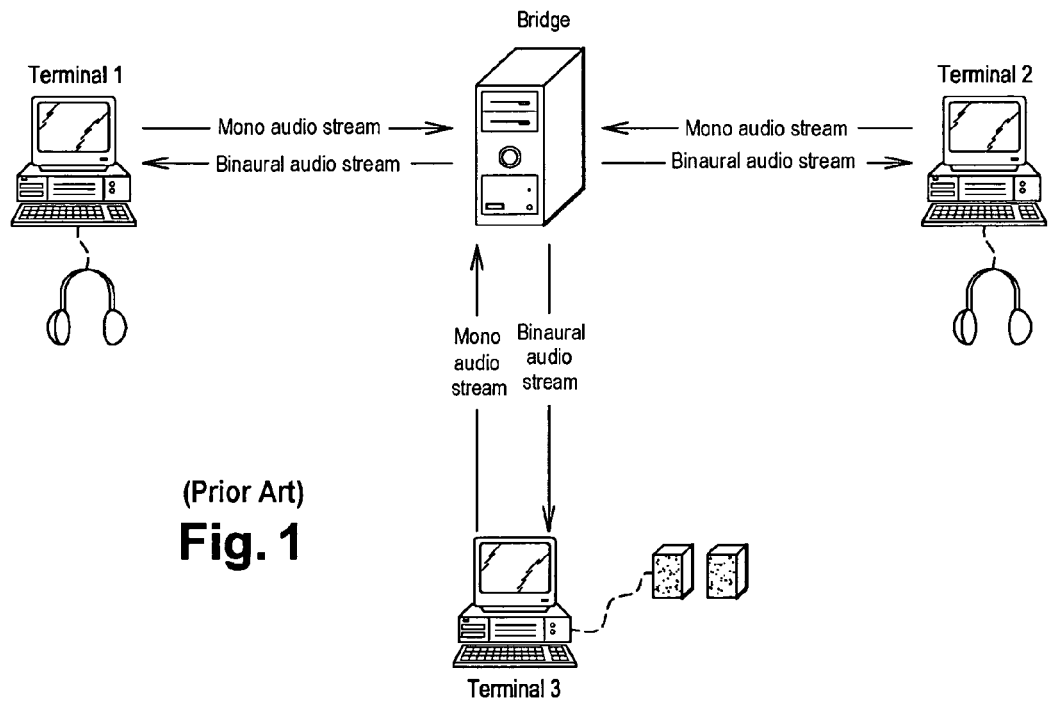
FIG. 1 is a diagram showing a prior art audio conference system including a bridge and three receiver terminals that transmit audio streams to the bridge using monophonic audio coding.
Figure 3:
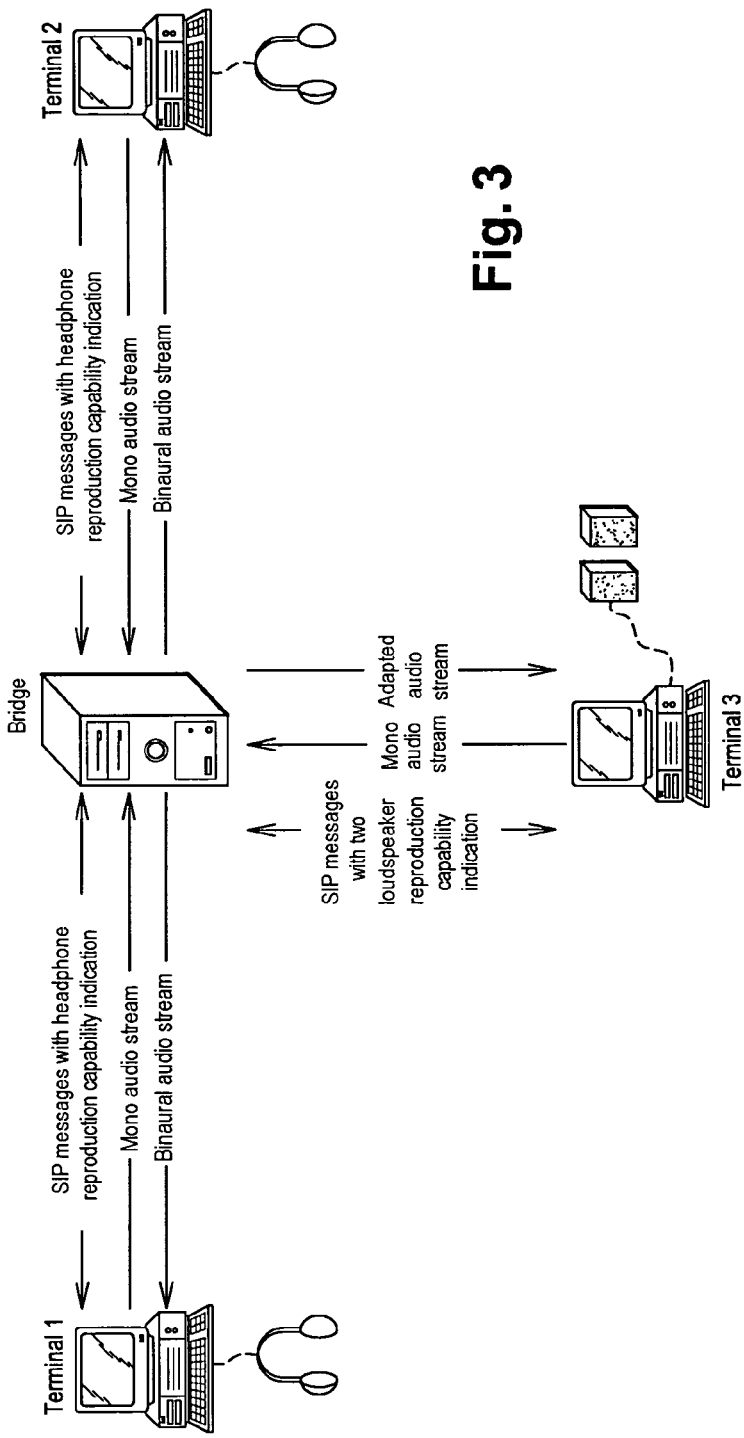
FIG. 3 is a diagram showing streams exchanged over a centralized multipoint connection in accordance with an embodiment of the invention.

FIG. 3 returns to the situation described with reference to FIG. 1 in relation to the prior art, but now in the context of the invention as defined above. Here the bridge takes account of information received concerning the reproduction formats of the terminals to determine the spatial coding mode to be used and to generate a sound scene for each terminal in the required reproduction format from the monophonic audio streams coming from the other terminals.

To be more precise, in FIG. 3, the terminal 3 has indicated in the SIP signaling messages that it wishes to listen in the stereo dipole format and so, after interpreting the information contained in the SIP messages, the bridge sends it the audio stream in the stereo dipole format.

To summarize, the method in accordance with an embodiment of the invention therefore includes information concerning the reproduction formats of the terminals set out in a given order of preference, so that another entity, such as a bridge, can take account of this information to determine the spatial coding to be used. That entity must also be able to indicate to the terminals the choice that it has made. In the voice over IP situation, that information is included in the SIP or H.323, etc. signaling messages exchanged.

Figure 4:
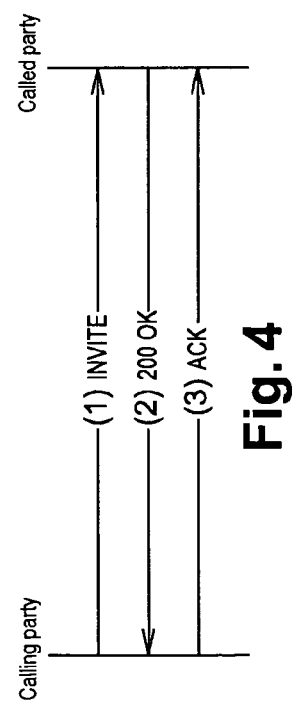
FIG. 4 is a diagram showing SIP messages exchanged between a sender entity and a receiver terminal in accordance with an embodiment of the invention.

FIG. 4 shows SIP messages for creating a call that can be used to implement the invention.

The message INVITE between a calling entity and a called entity can be used by a receiver terminal to include information concerning its reproduction formats and to communicate that information to the sender entity. In practice, as shown in FIG. 5, to this end an attribute is created in the SDP (Session Description Protocol) part of the message at the media level, i.e. for each definition of the audio stream by an "m=audio" line. This attribute, here consisting of a header "a=spat:", indicates the various reproduction formats of the terminal and the order of preference, which information can be specified by the terminal or directly by its user.

The header "a=spat:" can have the following arguments, for example:
- 0 if no spatial coding is required;
- 1 if binaural spatial coding is required;
- 2 if stereo dipole spatial coding is required;
- 3 if surround sound spatial coding is required.

These values can be standardized and defined in a correspondence table so that the associations are known to all. The order used in the "a=spat:" header can be the order of preference of the formats.

Thus the SIP INVITE message in FIG. 5 expresses the fact that the required reproduction formats are, in this order, the stereo dipole format, the surround sound format and no spatial coding.

The called entity, i.e. the sender entity, responds to the proposal sent by the calling entity, i.e. the receiver terminal, in the SIP INVITE message, with a SIP 200 OK message shown in FIG. 6. The SDP part of this message contains two types of information, namely, firstly, the information contained in the "a=spat_rep:" header that the audio data sent by the called entity to the calling entity will be spatially coded for the surround sound reproduction format, and, secondly, if the called entity is itself a receiver terminal, the SDP offer from the called entity specifying in the "a=spat:" header that the required formats are, in this order, the binaural format and no spatial coding.

Finally, the SIP ACK message in FIG. 7 contains the response of the calling entity to the offer from the called entity specified in the "a=spat:" header of the preceding SIP 200 OK message. In the present example, the SDP part of the SIP ACK message specifies in the "a=spat_rep:" header that the coded data sent by the calling entity will be spatially coded in the binaural format, according to the highest priority choice of the called entity.

Alternatively, it is possible to use the same sequence of messages but using the "exchange of capacity" SDP mode, as shown in FIG. 8. Each terminal can therefore specify the spatial audio streams that it can process by a blank exchange, i.e. without exchanging any audio stream. The terminal that sent the FIG. 8 message indicates that it prefers to receive the spatial audio streams in the surround sound format, the binaural format and, as a last resort, streams with no spatial coding.

Similarly, it is instead possible to define, for example again using SIP signaling, an XML "package" containing the various standardized reproduction formats (binaural, etc.). This information could also be specified by the terminal or directly by the user.

The invention claimed is:

1. A method of determining a spatial coding mode for audio data, the audio data being coded and sent by a sender entity (20) to a receiver terminal (10) adapted to receive audio data in one or more available reproduction formats, the sender entity being adapted to code data according to at least one spatial coding mode, wherein said method comprises the steps of:

the receiver terminal (10) indicating (1) to the sender entity (20) the one or more available reproduction formats of the receiver terminal in a given order of preference;

the sender entity (20) determining a mode for spatial coding of the audio data compatible with one of the reproduction formats indicated by the receiver terminal, taking into account the given order of preference; and the sender entity (20) indicating (2) to the receiver terminal (10) the reproduction format of the receiver terminal which is compatible with the determined mode for spatial coding in order for the receiver terminal to spatially decode received audio data by using a spatial decoding adapted to the compatible reproduction format.

2. The method according to claim 1, wherein said sender entity is a bridge in a centralized multipoint connection.

3. The method according to claim 1, wherein said sender entity is a terminal in a point-to-point or distributed multipoint connection.

4. The method according to claim 1, wherein the receiver terminal indicates said reproduction format(s) and said order of preference in a message sent to the sender entity and said sender entity indicates the reproduction format to be used in a response message sent to the receiver terminal.

5. The method according to claim 3, wherein the receiver terminal indicates said reproduction format(s) and said order of preference in a message sent to the sender entity and said sender entity indicates the reproduction format to be used in a response message sent to the receiver terminal, and wherein the sender entity also indicates one or more reproduction formats in a given order of preference in said response message and said receiver terminal indicates the reproduction format to be used in a response message sent to the sender entity.

6. The method according to claim 4, wherein said messages are signaling messages.

7. The method according to claim 6, wherein said signaling messages are SIP signaling messages.

8. A receiver terminal adapted to receive in one or more available reproduction formats spatial audio data sent by a sender entity, the sender entity being adapted to code data according to at least one spatial coding mode, wherein said receiver terminal is adapted to indicate to the sender entity the one or more available reproduction formats of the receiver terminal in a given order of preference and said sender entity is adapted to determine a spatial coding mode compatible with one of the reproduction formats indicated by the receiver terminal, taking into account the order of preference, the receiver terminal being adapted to receive an indication from the sender entity of the reproduction format of the receiver terminal which is compatible with the determined spatial coding mode in order for the receiver terminal to spatially decode received audio data by using a spatial decoding adapted to the compatible reproduction format.

9. A sender entity adapted to code data according to at least one spatial coding mode and send the spatial audio data to a receiver terminal adapted to receive spatial audio data in one or more available reproduction formats in a given order of preference, wherein said sender entity is adapted to receive from the receiver terminal an indication of the one or more available reproduction formats of the receiver terminal and to determine a spatial coding mode compatible with one of the reproduction formats indicated by the receiver terminal, taking into account the order of preference, the sender entity being further adapted to indicate to the receiver terminal the reproduction format of the receiver terminal which is compatible with the determined spatial coding mode in order for the receiver terminal to spatially decode received audio data by using a spatial decoding adapted to the compatible reproduction format.

* * * * *